US012158350B2

(12) United States Patent
Papp et al.

(10) Patent No.: US 12,158,350 B2
(45) Date of Patent: Dec. 3, 2024

(54) SYSTEM AND METHOD FOR DIRECTING A DRIVER OF AN ELECTRIC VEHICLE TO A POINT OF INTEREST AND A CHARGING STATION IN CLOSE PROXIMITY TO THE POINT OF INTEREST

(71) Applicant: Dr. Ing. h.c. F. Porsche Aktiengesellschaft, Stuttgart (DE)

(72) Inventors: Ethan Papp, Fremont, CA (US); Steffen Haug, Monte Sereno, CA (US)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 128 days.

(21) Appl. No.: 17/399,288

(22) Filed: Aug. 11, 2021

(65) Prior Publication Data

US 2023/0050118 A1    Feb. 16, 2023

(51) Int. Cl.
G01C 21/00 (2006.01)
G01C 21/34 (2006.01)
B60L 50/60 (2019.01)

(52) U.S. Cl.
CPC .......... *G01C 21/3476* (2013.01); *B60L 50/60* (2019.02)

(58) Field of Classification Search
CPC ............................ G01C 21/3476; B60L 50/60
See application file for complete search history.

(56) References Cited

U.S. PATENT DOCUMENTS

| | | | |
|---|---|---|---|
| 9,121,718 B2 | 9/2015 | Uyeki et al. | |
| 9,710,873 B1* | 7/2017 | Hill | G06T 11/00 |
| 10,787,095 B2 | 9/2020 | Milding et al. | |
| 2009/0240429 A1* | 9/2009 | Tanaka | G01C 21/343 707/999.107 |
| 2012/0109519 A1 | 5/2012 | Uyeki | |
| 2016/0061624 A1* | 3/2016 | Newlin | G01C 21/3611 701/426 |
| 2017/0308948 A1* | 10/2017 | Chikkannanavar | B60L 53/14 |
| 2019/0120654 A1* | 4/2019 | Todasco | G01C 21/3667 |
| 2019/0283623 A1* | 9/2019 | Takebayashi | B60R 21/01512 |
| 2021/0046841 A1* | 2/2021 | Cun | B60L 53/62 |
| 2021/0048302 A1* | 2/2021 | Maeda | B60L 58/12 |

FOREIGN PATENT DOCUMENTS

| | | |
|---|---|---|
| DE | 102010051469 A1 | 5/2012 |
| DE | 10 2019 111 273 A1 | 11/2020 |
| EP | 2 365 285 B1 | 9/2015 |

* cited by examiner

*Primary Examiner* — Khoi H Tran
*Assistant Examiner* — Tien Minh Le
(74) *Attorney, Agent, or Firm* — Buchanan Ingersoll & Rooney PC

(57) ABSTRACT

A computer-implemented method and computer program product for directing a driver of an electric vehicle to a point of interest and a charging station in close proximity to the point of interest. The method includes the steps of: (a) receiving from a user a requested activity of interest; (b) identifying one or more points of interest matching the requested activity of interest and that are within a pre-determined point of interest range from the electric vehicle; (c) identifying charging stations within a pre-determined station distance from each of the identified points of interest; and (d) presenting to the user the identified points of interest having an identified charging station within the pre-determined station distance. The computer program is configured to perform the aforementioned steps.

22 Claims, 3 Drawing Sheets

SYSTEM AND METHOD FOR DIRECTING A DRIVER OF AN ELECTRIC VEHICLE TO A POINT OF INTEREST AND A CHARGING STATION IN CLOSE PROXIMITY TO THE POINT OF INTEREST

TECHNICAL FIELD

The present subject matter relates to a system and method for directing a driver of an electric vehicle to a point of interest and a charging station in the vicinity of the point of interest.

BACKGROUND

Electric vehicles are commonly recharged at charging stations. The process of recharging a vehicle at a charging station takes at least 15 minutes. Many drivers would prefer to spend that time performing an activity, such as eating a meal, shopping, etc., rather than sitting idly in the vehicle waiting for the recharging process to finish. Described herein is a system and method that conveniently routes a driver to a point of interest (POI), such as a café, and a charging station in close proximity to that POI, based upon an activity of interest (AOI) (e.g., drinking coffee) inputted into the system by the driver. The system and method enable the driver to conveniently visit the POI (based upon the inputted AOI) while the vehicle is charging at the charging station that is within close proximity to the POI.

SUMMARY OF INVENTION

A method and computer program product for directing a driver of an electric vehicle to a point of interest and a charging station in close proximity to the point of interest. The method includes the steps of: (a) receiving from a user a requested activity of interest; (b) identifying one or more points of interest matching the requested activity of interest and that are within a pre-determined point of interest range from the electric vehicle; (c) identifying charging stations within a pre-determined station distance from each of the identified points of interest; and (d) presenting to the user the identified points of interest having an identified charging station within the pre-determined station distance. The computer program product is configured to perform the aforementioned steps.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
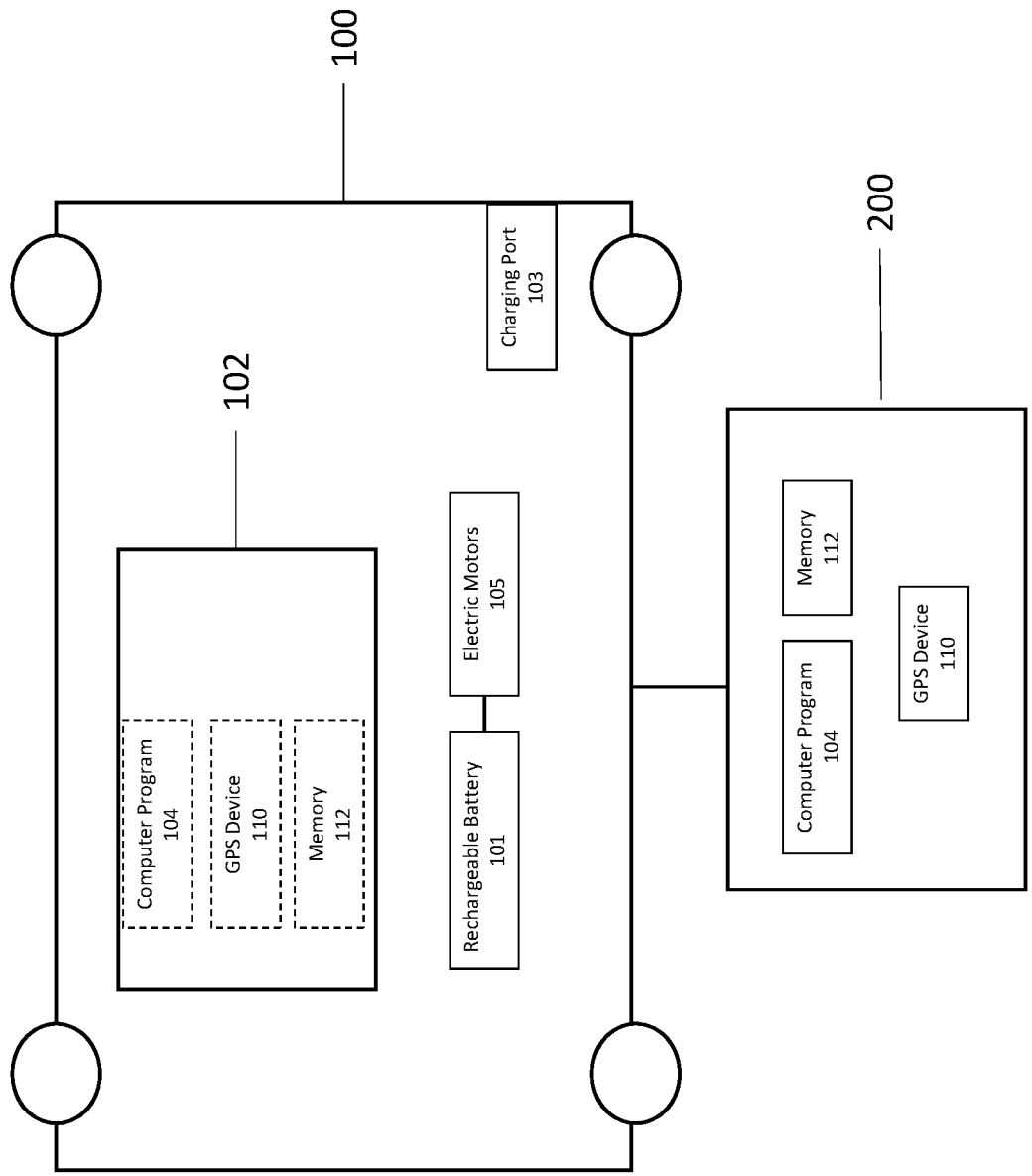
FIG. 1 depicts a schematic diagram of an electric vehicle and (optional) mobile device connected to the electric vehicle.

FIG. 1 depicts an electric vehicle 100 having a rechargeable battery 101, a computer 102 for controlling operations of vehicle 100, a charging port 103 used for charging the battery 101, and one or more electric motors 105 receiving charge from battery 101 for driving wheels of vehicle 100. An electronic mobile device 200 (otherwise referred to herein as a smartphone) is connected to vehicle computer 102 via a wired or wireless connection (e.g., Wi-Fi, cellular or Bluetooth connection). It is noted that components that are shown in broken lines in FIG. 1 are optional.

Vehicle computer 102 includes a processor, a visual display having means for both inputting data and displaying data (e.g., touchscreen), and a transmitter/receiver for communicating with mobile device 200 in a conventional manner. Mobile device 200 includes a processor, a visual display having means for both inputting data and displaying data (e.g., touchscreen), and a transmitter/receiver for communicating with vehicle 100 in a conventional manner.

A computer program 104 (program or application (app)) is stored in either computer 102 of vehicle 100 or electronic mobile device 200 (or both). According to one embodiment, program 104 is a mobile application stored within the mobile device 200; information can be inputted into program 104 via the display of mobile device 200; and information can be outputted from program 104 via the display of mobile device 200. According to another embodiment, program 104 is stored within the vehicle computer 102; information can be inputted into program 104 via the display of vehicle computer 102; and information can be outputted from program 104 via the display of vehicle computer 102. According to yet another embodiment, program 104 is stored within the mobile device 200; information can be inputted into program 104 via the display of mobile device 200; and information can be outputted from program 104 via the display of vehicle computer 102 (e.g., via CarPlay). According to still another embodiment, program 104 is stored within the mobile device 200; information can be inputted into program 104 via the display of mobile device 200; and information can be outputted from program 104 via the display of mobile device 200 and the display of vehicle computer 102.

Program 104 is connected to receive and transmit information from/to a GPS device 110 (e.g., a GPS chip) that uses the Global Positioning System (GPS). GPS device 110 is configured to determine the location of vehicle 100 or mobile device 200 within vehicle 100 in a conventional manner. GPS device 110 may form part of vehicle computer 102 or mobile device 200. This locational data can be stored in memory 112. Memory 112 may also form part of vehicle computer 102 or mobile device 200.

Figure 2:
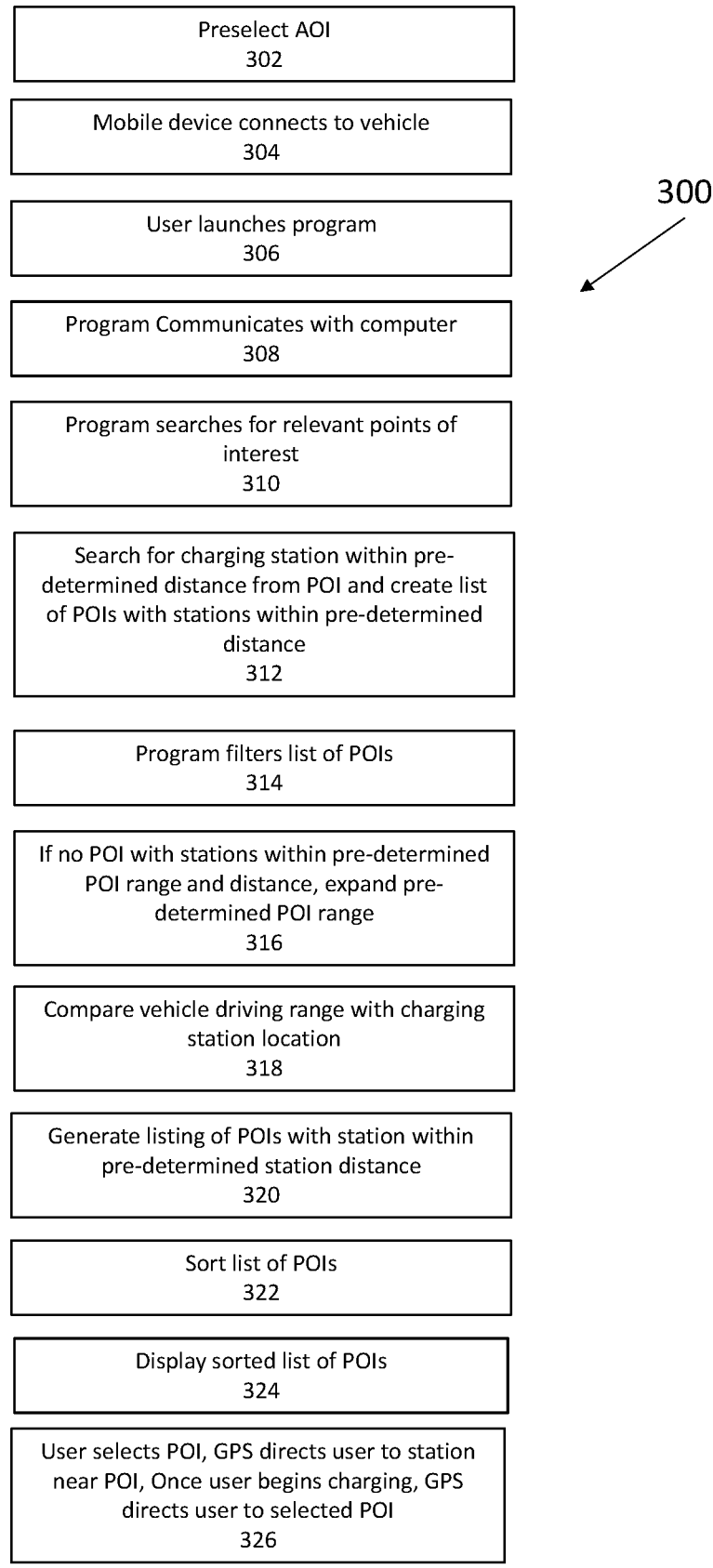
FIG. 2 is a flowchart depicting a method for directing a driver of an electric vehicle to a point of interest and a charging station in the vicinity of the point of interest.

FIG. 2 is a flowchart depicting a method 300 for directing a driver of electric vehicle 100 to a point of interest 500 and a charging station 600 in the vicinity of the point of interest 500. At the outset it is noted that method 300 uses mobile device 200 along with vehicle 100 to accomplish method 300, however, it should be understood that mobile device 200 may be omitted and the steps of method 300 may be completed using vehicle 100.

At step 302 of method 300, a user preselects an activity of interest (AOI) that they desire to undertake while charging the vehicle 100. It is noted that the AOI may be, for example, a broad general category including activity types (e.g., movie, shopping, laundry, etc.), items sold at businesses (e.g., taco, food, shirt, coffee, etc.), business types (e.g., restaurant, clothing store, mall, hotel, motel, laundromat, movie theatre, etc.), business names (Starbucks, Walmart or AMC movie theatre), for example. A particular address may or may not be considered as constituting an 'activity of interest.'

Step 302 may occur either prior to a vehicle trip or during the vehicle trip. According to this embodiment, the selection is accomplished using the input device (e.g., touch screen) of mobile device 200, however, it should be understood that the selection could be accomplished using the input device (e.g., touch screen, stylus, mouse pad, keyboard, etc.) of vehicle 100. The AOI search (e.g., "Tacos and Vehicle Charge") is saved in memory 112 of mobile device 200 for either current use or later use. The AOI search saved in memory 112 is made available for use by program 104. It should be understood that mobile device 200 does not (necessarily) perform the AOI search at this stage. Once saved, the saved AOI search may be presented to the user as a selectable icon (e.g., icon named "Tacos and Vehicle Charge"), for example, on the display of mobile device 200. Step 302 may be repeated to save further AOI searches, such as "Movie and Vehicle Charge," "McDonalds and Vehicle Charge," etc. Each icon may be in the form of a single softkey button on the display.

At step 304, mobile device 200 is connected to vehicle 100 in either a wired or wireless manner, as described above. If the steps of method 300 are completed by vehicle 100 itself (and without the assistance of mobile device 200), then this step may be omitted. Also, step 304 does not necessarily have to follow step 302.

At step 306, the user (e.g., driver or passenger of vehicle 100) launches program 104 on device 200 and selects one of the aforementioned saved AOI searches using one of the available icons in program 104. Accordingly, device 200 receives the selected AOI search. For purposes of this example, it is assumed that the user selects the "Tacos and Vehicle Charge" AOI search.

At step 308, program 104 communicates with computer 102 of vehicle 100 to gather the following information: (i) amount of vehicle charge remaining or vehicle range remaining (e.g., 100 miles), (ii) type of charge port on vehicle, and (iii) current position of vehicle 100. It is noted that mobile device 200 may already know the position of vehicle 100 based upon the known position of mobile device 200 that is stowed in vehicle 100. Also, the type of charge port on vehicle 100 may be entered by the user without requesting that information from vehicle 100. At the very least, program 104 communicates with computer 102 of vehicle 100 to identify the amount of vehicle charge remaining or the vehicle range remaining (e.g., 100 miles).

At step 310, program 104 recursively searches for relevant points of interest 500 (i.e., places of business that sell tacos, e.g., Taco Bell) that match the selected AOI search within a pre-determined POI range (e.g., 10,000 meters) from the current location of vehicle 100. The pre-determined POI range may be selected by the user. Also, the pre-determined POI range may be associated and saved along with the saved search. The points of interest 500 may be uploaded from the Internet, a GPS program or another program (Google maps) or saved in memory 112.

At step 312, for each point of interest 500 within the pre-determined POI range identified at step 310, program 104 searches for a vehicle charging station 600 within a pre-determined station distance (e.g., 200 meters) from that point of interest 500. The pre-determined station distance (e.g., 200 meters) is the distance separating that point of interest 500 from a particular charging station. The pre-determined station distance may be a distance that is walkable by the user, and is significantly less than the drivable pre-determined POI range. The pre-determined station distance may be selected by the user. Also, the pre-determined station distance may be associated and saved along with the saved search. If a POI does not have a charging station within the pre-determined station distance, then that POI 500 is discarded. Program 104 then creates a listing of POI's 500 identified at step 310 having stations 600 within the pre-determined station distance.

As part of step 312, program 104 is also configured to check that the identified stations 600 have chargers that match the type of charge port on vehicle 100 mentioned at step 308. Program 104 also checks the charging rate capabilities (e.g., 7 kW, 11 kW or 22 kW) for each station 600, which information may be used later. Stations 600 that do not have chargers that match the type of charge port on vehicle 100 are discarded. Also, program 104 identifies the charging rate capability for each station 600, which can be presented at a later time to the user.

At step 314, program 104 filters the listing created at step 312. More particularly, program 104 is configured to filter the listing to identify to the user the most highly relevant POI'S 500 based upon user settings (e.g., price, user ratings, quality) and/or crowd-sourced data (e.g., popularity, price, user ratings, rankings, quality). The filters may be set by the user in program 104. POI'S 500 that do not meet one or more qualifications or standards are (optionally) filtered out of the listing.

It is noted that step 314 may be performed as part of step 310 to simplify the required processing.

At step 316, if program 104 is unable to identify any POI's 500 within the pre-determined POI range and having a respective station 600 within the pre-determined station distance, then program expands the pre-determined POI range. Alternatively, or in combination, if program 104 is unable to identify any POI's 500 within the pre-determined POI range and having a respective station 600 within the pre-determined station distance, then program 104 expands the pre-determined station distance.

At step 318, program 104 compares the available driving range of vehicle 100 mentioned at step 308 with the location of the stations 600 for each POI 500. If the location of a particular station 600 is outside of the driving range of vehicle 100, then that station 600 and its associated POI 500 is omitted from the listing. It is noted that step 318 may be performed as part of step 310 to simplify the required processing. Or, the pre-determined POI range at step 310 may be set as a function of the driving range of vehicle 100.

At step 320, program 104 generates an internal listing of POI's 500 within the pre-determined POI range (expanded or not) and having a respective station 600 within the pre-determined station distance (expanded or not).

Figure 3:
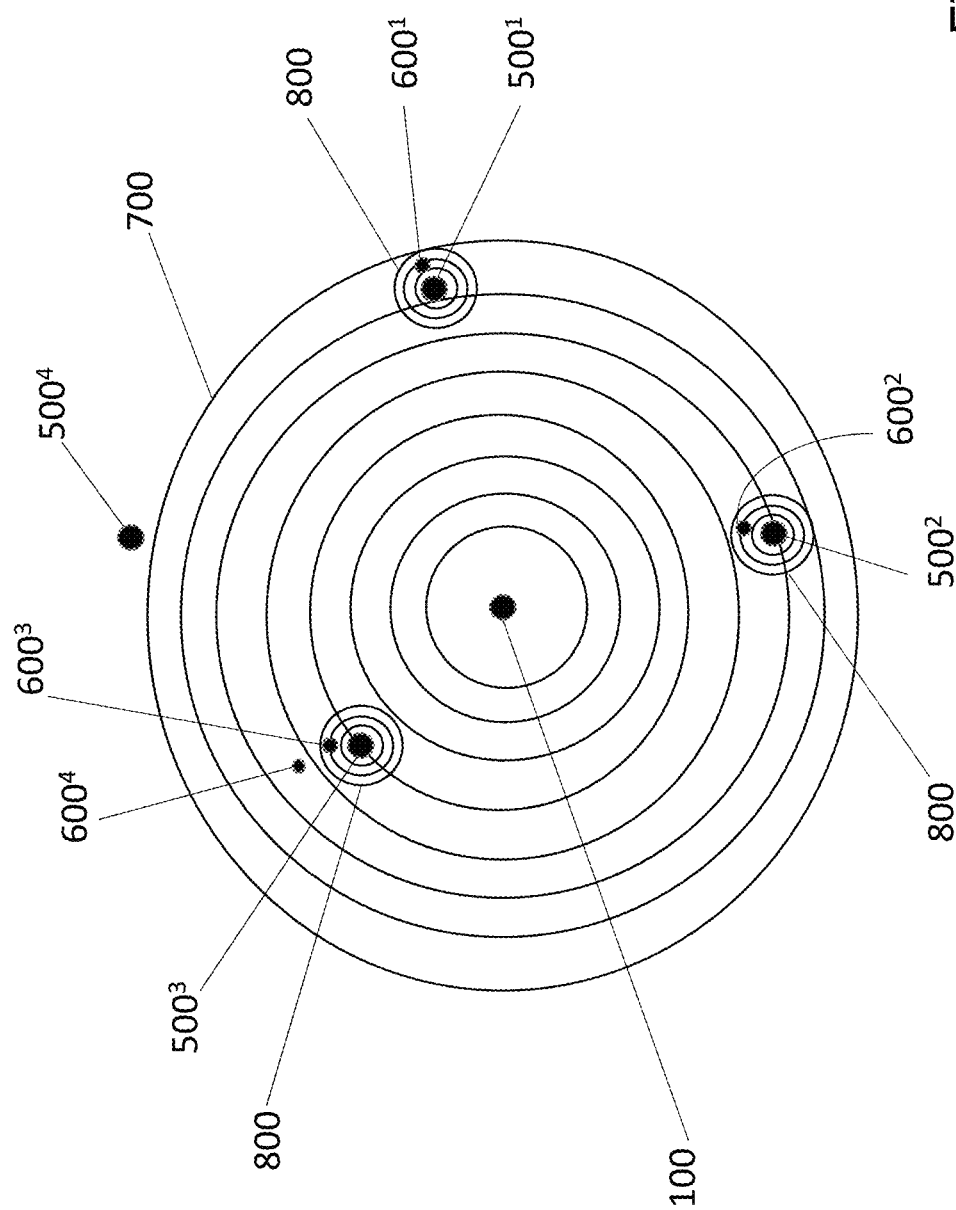
FIG. 3 depicts a pictorial representation of multiple points of interest (POI) and charging stations in the vicinity of the vehicle.

FIG. 3 depicts a pictorial representation of multiple points of interest (POI) $500^1$-$500^3$ and charging stations $600^1$-$600^3$ in the vicinity of vehicle 100. Specifically, each POI 500 identified within the pre-determined POI range 700 has a respective station 600 that is located within the pre-determined station distance 800 for that respective POI 500. It is noted that POI $500^4$ is outside of the pre-determined POI range 700, and therefore will not be presented to the user.

And, charging station $600^4$ is outside of the pre-determined station distance 800 from POI $500^3$, and, therefore, also will not be presented to the user.

At step 322, before displaying to the user the internal listing of POI's 500 generated at step 320, the listing may be sorted, arranged and organized in a certain fashion.

As one example for sorting the listing, program 104 checks the location of the POI's 500 and automatically organizes the POI's 500 such that the POI's 500 that are closest in proximity to vehicle 100 appear at the top of the list.

As another example, program 104 checks the rankings of the POI's 500 (e.g., popularity, price, user ratings, rankings, quality) and automatically organizes the POI's 500 such that the POI's 500 that are ranked highest appear at the top of the list.

As yet another example, program 104 checks the driving range of vehicle 100 mentioned at step 308. If, for example, the driving range of vehicle 100 is below a pre-determined range threshold (e.g., 5 miles) (which threshold may be factory set or user set), then program 104 automatically organizes the listing of POI's 500 generated at step 318 such that the POI's 500 nearest to vehicle 100 appear at the top of the list. Alternatively or in combination, if the driving range of vehicle 100 is below the pre-determined range threshold, then program 104 automatically organizes the listing of POI's 500 generated at step 318 such that the POI's 500 that are associated with the fastest charging stations 600 (refer back to step 312) appear at the top of the list.

At step 324, the sorted listing of POI's 500 within the pre-determined POI range 700 and having a respective station 600 within the pre-determined station distance 800 are displayed to the user via the display on the mobile device 200.

Program 104 is configured such that the user can manually sort the listing of POI's 500 (e.g., closest in proximity appears first), and/or filter the listing of POI's 500 based on one or more qualities (price, quality, user rankings, charging speed or cost of station 600 associated with POI 500) to match their preferences.

At step 326, the user then selects one of the POI's 500 in the listing, and GPS device 110 of mobile device 200 directs the user to the station 600 associated with the selected POI 500. Once the user/driver reaches the station 600 and begins charging vehicle 100, GPS device 110 directs the user to the selected POI 500.

It should be understood that method 300 is not limited to any particular step or sequence of steps.

Also, although it has been described that mobile device 200 performs the steps described herein, it should be understood that vehicle computer 102 may perform these steps in lieu of mobile device 200. Vehicle computer 102 may send and receive data via Wi-Fi or 4G/LTE radios built into vehicle 100, by way of example.

It is noted that the prior art may disclose methods for locating charging stations along an existing driving route, or methods for locating points of interest along a driving route, however, the method described herein is directed to receiving a desired activity of interest from a user, finding a point of interest related to the activity of interest, wherein the point of interest has a charging station in near proximity to that point of interest so that the end user can conveniently visit that point of interest while the vehicle is charging at the nearby charging station. The entire purpose of the user's trip may be to simply charge the vehicle while conveniently visiting a point of interest based upon their activity of interest.

For example, if the activity of interest entered by the user of program 104 is 'taco,' then program 104 will search for points of interest including stores offering tacos within the pre-determined point of interest range as well as charging stations in close proximity to those stores. The search may be a web-based search using Google or Google maps, for example. If the activity of interest is 't-shirt,' then the activity of interest is the activity of shopping for t-shirts while the user's vehicle is charging. Program 104 will search for points of interest including stores offering t-shirts within the pre-determined point of interest range. If the activity of interest is 'Starbucks' (i.e., visiting a Starbucks store), then program 104 will search for Starbucks stores, and so forth. An activity of interest comprising a specific address may (or may not) be considered outside of the scope of the claimed term 'activity of interest.'

It will be understood that the operational steps are performed by the computers or processors described herein upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computers or processors described herein described herein is implemented in software code or instructions which are tangibly stored on a tangible computer readable medium. Upon loading and executing such software code or instructions by the computers or processors, the computers or processors may perform any of the functionality of the computers or processors described herein, including any steps of the methods described herein.

The term "software code" or "code" used herein refers to any instructions or set of instructions that influence the operation of computers or processors. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It will also be understood that the terms and expressions used herein have the ordinary meaning as is accorded to such terms and expressions with respect to their corresponding respective areas of inquiry and study except where specific meanings have otherwise been set forth herein. The terms "comprises," "comprising," "includes," "including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A computer-implemented method for directing a driver of an electric vehicle to a point of interest and a charging station in close proximity to the point of interest, said method comprising the steps of:
  (a) receiving from a user during a vehicle trip, via a touchscreen of a mobile device or via a user interface of the vehicle, a combined request to perform a requested activity of interest and visit the charging station;
  (b) identifying a plurality of points of interest matching the requested activity of interest and that are each (i) within a pre-determined point of interest range set by the user from a location of the electric vehicle and (ii) within a pre-determined station distance set by the user from one or more charging stations, wherein the points of interest are identified before the one or more charging stations, wherein the location of the electric vehicle is determined by a Global Positioning System (GPS) device, and wherein the plurality of points of interest and the one or more charging stations are uploaded by a transmitter/receiver communicating with an Internet or a GPS-connected program;
  (c1) comparing a remaining driving range of the electric vehicle with a distance between the electric vehicle and each of the one or more identified charging stations for each of the identified points of interest;
  (c2) excluding at least one of the identified points of interest when the comparing step (c1) indicates that the distance between the electric vehicle and the one or more identified charging stations for said at least one of the identified points of interest exceeds the remaining driving range of the electric vehicle;
  (d) automatically presenting to the user the identified points of interest having one or more identified charging stations that are within the pre-determined station distance and that do not exceed the remaining driving range of the electric vehicle such that the identified points of interest nearest to the electric vehicle appear at a top of a list of the identified points of interest;
  (e) receiving from the user a selected point of interest from the identified points of interest that were presented to the user at step (d); and
  (f) navigating the electric vehicle to the identified charging station that is associated with the selected point of interest,
  wherein steps (a) and (b) are performed before charging of the electric vehicle is required, and wherein step (b) is performed prior to steps (c1) and (c2).

2. The computer-implemented method of claim 1, wherein step (f) comprises presenting directions to the user for navigating the electric vehicle to the identified charging station that is associated with the selected point of interest.

3. The computer-implemented method of claim 1, wherein the requested activity of interest is a general category.

4. The computer-implemented method of claim 3, wherein the general category includes activity types.

5. The computer-implemented method of claim 4, wherein the general category includes items sold at businesses, business types, and/or business names.

6. The computer-implemented method of claim 1, wherein steps (a) through (d) are performed by a mobile device comprising a smartphone that is connected to the electric vehicle.

7. The computer-implemented method of claim 1, wherein steps (a) through (d) are performed by a computer of the electric vehicle.

8. The computer-implemented method of claim 1, wherein the requested activity of interest does not comprise a specific geographic address.

9. The computer-implemented method of claim 1, wherein the requested activity of interest does comprise a specific geographic address.

10. The computer-implemented method of claim 1, wherein steps (b), (c1) and (c2) are performed using an Internet search.

11. The computer-implemented method of claim 1, further comprising a step (g) of, after the user reaches the identified charging station and begins charging of the electric vehicle, presenting directions to the user for navigating the user to the selected point of interest.

12. The computer-implemented method of claim 1, further comprising a step of filtering and sorting the points of interest for the user.

13. The computer-implemented method of claim 1, wherein the pre-determined point of interest range is set as a function of the remaining driving range for the vehicle.

14. The computer-implemented method of claim 1, further comprising comparing the remaining driving range for the vehicle to a pre-determined driving range threshold, and when the remaining driving range for the vehicle is below the pre-determined driving range threshold, automatically presenting to the user the identified points of interest such that the identified points of interest nearest to the electric vehicle appear at the top of the list of the identified points of interest.

15. The computer-implemented method of claim 1, further comprising comparing the remaining driving range for the vehicle to a pre-determined driving range threshold, and when the remaining driving range for the vehicle is below the pre-determined driving range threshold, automatically presenting to the user the identified points of interest such that the identified points of interest associated with fastest charging stations appear at the top of the list of the identified points of interest.

16. The computer-implemented method of claim 1, further comprising checking rankings of the identified points of interest and automatically presenting to the user the identified points of interest such that the identified points of interest that are ranked highest appear at the top of the list of the identified points of interest.

17. A non-transitory computer program product for directing a driver of an electric vehicle to a point of interest and a charging station in close proximity to the point of interest, wherein the computer program product comprises instructions stored in a non-transitory computer-readable recording medium and configured to be executed by a processor for:
  (a) receiving from a user during a vehicle trip, via a touchscreen of a mobile device or via a user interface of the vehicle, a combined request to perform a requested activity of interest and visit the charging station;
  (b) identifying a plurality of points of interest matching the requested activity of interest and that are each (i) within a pre-determined point of interest range set by the user from a location of the electric vehicle and (ii) within a pre-determined station distance set by the user from one or more charging stations, wherein the points of interest are identified before the one or more charging stations, wherein the location of the electric vehicle is determined by a Global Positioning System (GPS) device, and wherein the plurality of points of interest and the one or more charging stations are uploaded by a transmitter/receiver communicating with an Internet or a GPS-connected program;

(c1) comparing a remaining driving range of the electric vehicle with a distance between the electric vehicle and each of the one or more identified charging stations for each of the identified points of interest;

(c2) excluding at least one of the identified points of interest when the comparing step (c1) indicates that the distance between the electric vehicle and the one or more identified charging stations for said at least one of the identified points of interest exceeds the remaining driving range of the electric vehicle;

(d) automatically presenting to the user the identified points of interest having one or more identified charging stations that are within the pre-determined station distance and that do not exceed the remaining driving range of the electric vehicle such that the identified points of interest nearest to the electric vehicle appear at a top of a list of the identified points of interest;

(e) receiving from the user a selected point of interest from the identified points of interest that were presented to the user; and (f) navigating the electric vehicle to the identified charging station that is associated with the selected point of interest, wherein steps (a) and (b) are performed before visiting a charging station, and wherein step (b) is performed prior to steps (c1) and (c2).

18. The non-transitory computer program product of claim 17, wherein the non-transitory computer program product is executed on a smartphone.

19. The non-transitory computer program product of claim 17, wherein the non-transitory computer program product is executed on a computer of the electric vehicle.

20. An electric vehicle comprising the non-transitory computer program product of claim 17.

21. The non-transitory computer program product of claim 17, wherein steps (a) and (b) are performed before charging of the electric vehicle is required.

22. The non-transitory computer program product of claim 17, wherein the non-transitory computer program product is configured to receive and transmit information from and to the GPS device and to determine a location of a mobile device within the electric vehicle.

* * * * *